(12) United States Patent
Sarangam et al.

(10) Patent No.: US 11,178,023 B2
(45) Date of Patent: Nov. 16, 2021

(54) DATA PLANE INTERFACE NETWORK QUALITY OF SERVICE IN MULTI-TENANT DATA CENTERS

(71) Applicant: Intel Corporation, Santa Clara, CA (US)

(72) Inventors: Parthasarathy Sarangam, Portland, OR (US); Anjali Jain, Portland, OR (US); Kevin Scott, Forest Grove, OR (US)

(73) Assignee: Intel Corporation, Santa Clara, CA (US)

( * ) Notice: Subject to any disclaimer, the term of this patent is extended or adjusted under 35 U.S.C. 154(b) by 880 days.

(21) Appl. No.: 15/638,959

(22) Filed: Jun. 30, 2017

(65) Prior Publication Data

US 2019/0007280 A1  Jan. 3, 2019

(51) Int. Cl.
*H04L 12/24* (2006.01)
*H04L 12/911* (2013.01)
(Continued)

(52) U.S. Cl.
CPC ........ *H04L 41/5003* (2013.01); *H04L 43/026* (2013.01); *H04L 47/805* (2013.01); *H04L 47/821* (2013.01); *H04L 47/822* (2013.01); *G06F 9/5027* (2013.01); *G06F 9/5083* (2013.01); *H04L 41/0813* (2013.01); *H04L 41/0893* (2013.01); *H04L 41/50* (2013.01); *H04L 41/5019* (2013.01); *H04L 41/5035* (2013.01); *H04L 43/08* (2013.01)

(58) Field of Classification Search
CPC . H04L 45/38; H04L 47/2441; H04L 47/6215; H04L 47/6295; H04L 47/24
See application file for complete search history.

(56) References Cited

U.S. PATENT DOCUMENTS 6,938,097 B1 * 8/2005 Vincent ................... H04L 47/52
  709/240
7,853,957 B2 * 12/2010 Shah ....................... H04L 49/90
  719/318

(Continued)

*Primary Examiner* — Philip C Lee
(74) *Attorney, Agent, or Firm* — Compass IP Law PC

(57) ABSTRACT

Methods, apparatus, and systems for data plane interface network Quality of Service (QoS) in multi-tenant data centers. Data plane operations including packet generation and encapsulation are performed in software running in virtual machines (VMs) or containers hosted by a compute platform. Control plane operations, including QoS traffic classification, are implemented in hardware by a network controller. Work submission and work completion queues are implemented in software for each VM or container. Work elements (WEs) defining work to be completed by the network controller are generated by software and processed by the network controller to classify packets associated with the WEs into QoS traffic classes, wherein packets belonging to a give traffic flow are classified to the same QoS traffic class. The network controller is also configured to perform scheduling of packet egress as a function of the packet's QoS traffic classifications, to transmit packets that are scheduled for egress onto the network, and to DMA indicia to the work completion queues to indicate the work associated with WEs has been completed.

25 Claims, 8 Drawing Sheets

(51) Int. Cl.
   *H04L 12/927* (2013.01)
   *H04L 12/26* (2006.01)
   *G06F 9/50* (2006.01)

(56) References Cited

U.S. PATENT DOCUMENTS

| | | | |
|---|---|---|---|
| 9,755,978 B1* | 9/2017 | Mogul | H04L 47/2441 |
| 2008/0148032 A1* | 6/2008 | Freimuth | G06F 13/42 |
| | | | 713/1 |
| 2010/0131669 A1* | 5/2010 | Srinivas | G06F 9/452 |
| | | | 709/233 |
| 2013/0298123 A1* | 11/2013 | Zuo | H04L 41/0896 |
| | | | 718/1 |
| 2015/0089011 A1* | 3/2015 | Alanis | G06F 11/0778 |
| | | | 709/212 |
| 2015/0172169 A1* | 6/2015 | DeCusatis | H04L 47/12 |
| | | | 718/1 |
| 2016/0342547 A1* | 11/2016 | Liss | H04L 49/9068 |
| 2017/0093677 A1* | 3/2017 | Skerry | H04L 43/106 |
| 2017/0168970 A1* | 6/2017 | Sajeepa | G06F 13/24 |
| 2017/0177528 A1* | 6/2017 | Harriman | G06F 13/4282 |
| 2017/0214774 A1* | 7/2017 | Chen | G06F 13/128 |
| 2018/0083866 A1* | 3/2018 | Gobriel | H04L 45/02 |
| 2018/0322913 A1* | 11/2018 | Friedman | G06F 12/0653 |

* cited by examiner

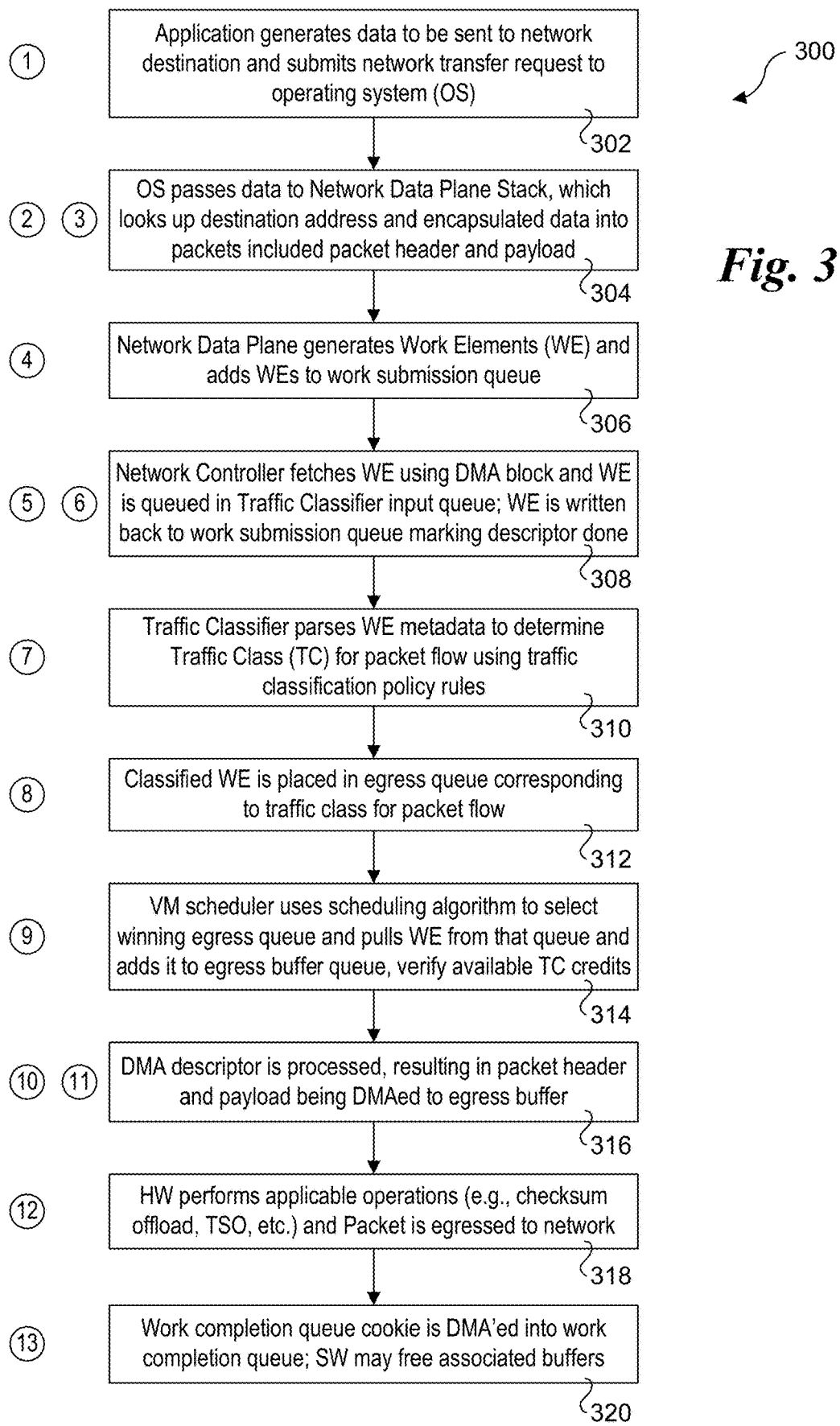

DATA PLANE INTERFACE NETWORK QUALITY OF SERVICE IN MULTI-TENANT DATA CENTERS

BACKGROUND INFORMATION

During the past decade, there has been tremendous growth in the usage of so-called "cloud-hosted" services. Examples of such services include e-mail services provided by Microsoft (Hotmail/Outlook online), Google (Gmail) and Yahoo (Yahoo mail), productivity applications such as Microsoft Office 365 and Google Docs, and Web service platforms such as Amazon Web Services (AWS) and Elastic Compute Cloud (EC2) and Microsoft Azure. Cloud-hosted services are typically implemented using data centers that have a very large number of compute resources, implemented in racks of various types of servers, such as blade servers filled with server blades and/or modules and other types of server configurations (e.g., 1U, 2U, and 4U servers).

In recent years, virtualization of computer systems has seen rapid growth, particularly in server deployments and data centers. Under a conventional approach, a server runs a single instance of an operating system directly on physical hardware resources, such as the CPU, RAM, storage devices (e.g., hard disk), network controllers, I/O ports, etc. Under one virtualized approach using Virtual Machines (VMs), the physical hardware resources are employed to support corresponding instances of virtual resources, such that multiple VMs may run on the server's physical hardware resources, wherein each virtual machine includes its own CPU allocation, memory allocation, storage devices, network controllers, I/O ports etc. Multiple instances of the same or different operating systems then run on the multiple VMs. Moreover, through use of a virtual machine manager (VMM) or "hypervisor," the virtual resources can be dynamically allocated while the server is running, enabling VM instances to be added, shut down, or repurposed without requiring the server to be shut down. This provides greater flexibility for server utilization, and better use of server processing resources, especially for multi-core processors and/or multi-processor servers.

Under another virtualization approach, container-based OS virtualization is used that employs virtualized "containers" without use of a VMM or hypervisor. Instead of hosting separate instances of operating systems on respective VMs, container-based OS virtualization shares a single OS kernel across multiple containers, with separate instances of system and software libraries for each container. As with VMs, there are also virtual resources allocated to each container.

Deployment of Software Defined Networking (SDN) and Network Function Virtualization (NFV) has also seen rapid growth in the past few years. Under SDN, the system that makes decisions about where traffic is sent (the control plane) is decoupled for the underlying system that forwards traffic to the selected destination (the data plane). SDN concepts may be employed to facilitate network virtualization, enabling service providers to manage various aspects of their network services via software applications and APIs (Application Program Interfaces). Under NFV, by virtualizing network functions as software applications, network service providers can gain flexibility in network configuration, enabling significant benefits including optimization of available bandwidth, cost savings, and faster time to market for new services.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein like reference numerals refer to like parts throughout the various views unless otherwise specified:

FIG. 3 is a flowchart illustrating operations performed by the software and hardware layers of the architecture of FIGS. 2 and 2a to support packet-processing operations including QoS traffic classification of packet flows on the network controller, according to one embodiment;

DETAILED DESCRIPTION

Figure 1:
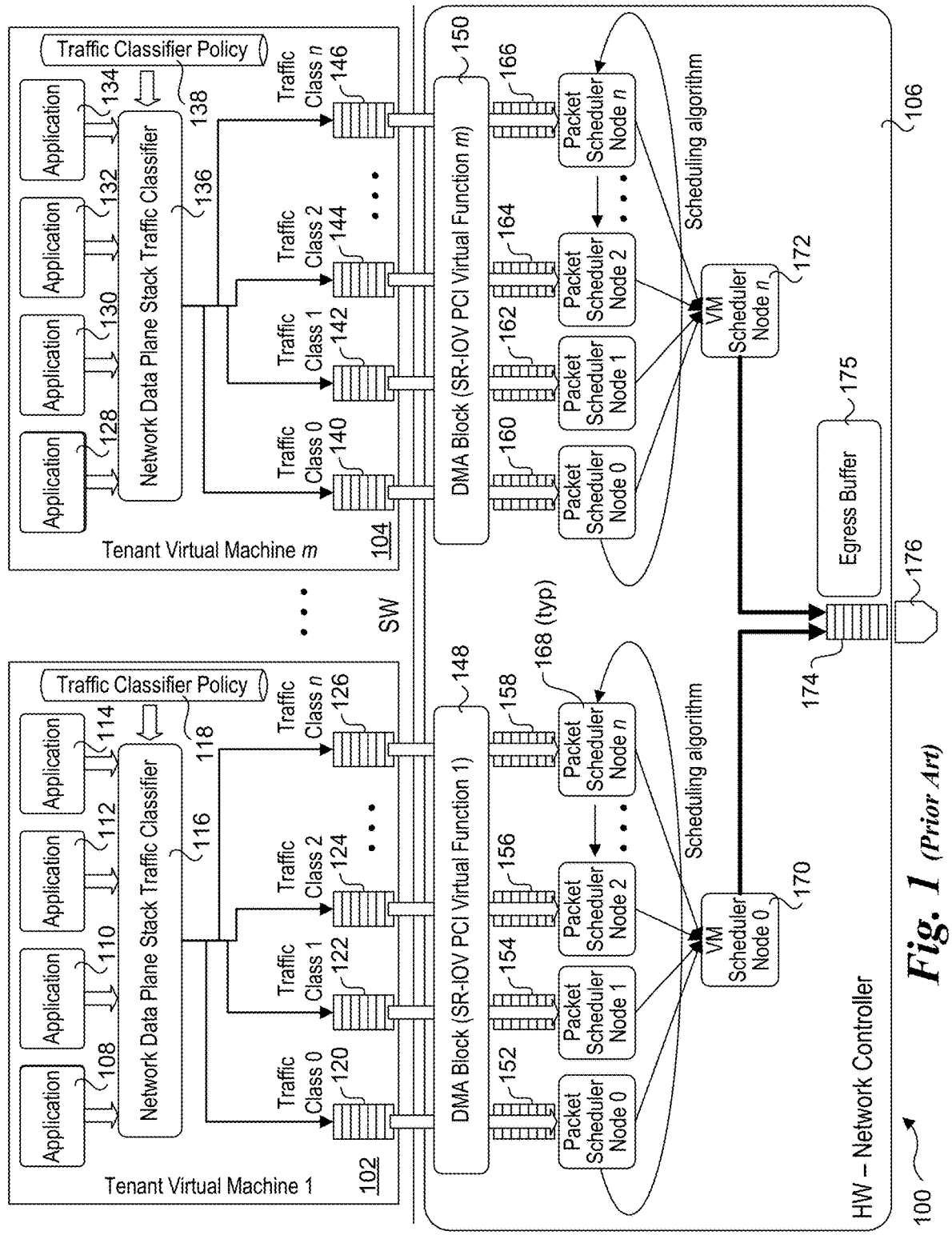
FIG. 1 is a schematic drawing of a prior art packet-processing architecture under which QoS traffic classification is performed in a software layer running on tenant virtual machines.

Embodiments of methods, apparatus, and systems for data plane interface network quality of service in multi-tenant data centers are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

For clarity, individual components in the Figures herein may also be referred to by their labels in the Figures, rather than by a particular reference number. Additionally, reference numbers referring to a particular type of component (as opposed to a particular component) may be shown with a reference number followed by "(typ)" meaning "typical." It will be understood that the configuration of these components will be typical of similar components that may exist but are not shown in the drawing Figures for simplicity and clarity or otherwise similar components that are not labeled with separate reference numbers. Conversely, "(typ)" is not to be construed as meaning the component, element, etc. is typically used for its disclosed function, implement, purpose, etc.

Under current approaches, an operating system's network data plane stack receives packets from applications and classifies packets into different network traffic classes. In some instances, the application itself may request a traffic class for its traffic using operating system APIs. In both cases, the operating system's network data plane classifies and assigns a QoS traffic class to packets by enforcing the QoS policy defined by the tenant operating each VM. Once the packet is classified into a QoS traffic class, the software-based network data plane then chooses an appropriate egress queue of the underlying network controller to transmit the packet.

FIG. 1 shows an architecture 100 illustrating one example of the current approach under which traffic classification is implemented in software. The diagram is split into two halves; the upper half corresponds to a software (SW) layer, while the lower half corresponds to a hardware (HW) layer. More particular, the software layer includes m virtual machines (VMs), as depicted by virtual machine 102 and 104 (also labeled Tenant Virtual Machine 1 and Tenant Virtual Machine m, wherein m is an integer having a value of two or more. The hardware layer includes a network controller 106.

Each of virtual machines 102 and 104 are configured in a similar manner. Virtual machine 102 includes four applications 108, 110, 112, and 114, a network data plane stack traffic classifier 116, packet buffers 117, a traffic classification policy 118 and n virtual egress queues, as depicted by virtual egress queues 120, 122, 124, and 126. Similarly, virtual machine 104 includes four applications 128, 130, 132, and 134, a network data plane stack traffic classifier 136, packet buffers 137, a traffic classification policy 138 and n virtual egress queues, as depicted by virtual egress queues 140, 142, 144, and 146. The four applications for each of virtual machines 102 and 104 are merely illustrative of an example number of application that may run on a VM; generally, a given VM may host one or more applications. Each of the virtual egress queues on each of virtual machines 102 and 104 is allocated for a respective traffic class, as depicted by traffic classes 0, 1, 2 . . . n. It is noted that two or more virtual egress queues may be associated with the same traffic class under some embodiments.

Network controller 106 includes m DMA blocks, each implementing a respective Single Root Virtual SR-IOV Peripheral Component Interconnect (PCI) virtual function for each of the m tenant VMs, as depicted by DMA blocks 148 and 150. To reduce the resource overhead associate with use of virtualization, PCI-SIG® developed the SR-IOV specification. The use of SR-IOV provides many benefits over the conventional virtualization intermediary (VI) approach, including providing the ability to eliminate VI involvement in main data movement actions, e.g., DMA (Direct Memory Access), memory space access, interrupt processing, etc.; elimination of virtualization intermediary interception and processing of each I/O operation; providing a standardized method to control SR-IOV resource configuration and management through a Single Root PCI Manager (SR-PCIM); providing the ability to reduce the hardware requirements and associated cost with provisioning potentially a significant number of I/O Functions within a device; and providing the ability to integrate SR-IOV with other I/O virtualization technologies such as Address Translation Services (ATS), Address Translation and Protection Table (ATPT) technologies, and interrupt remapping technologies to create robust, complete I/O virtualization solutions.

As an option, DMA blocks 148 and 150 may employ Scalable IOV (S-IOV). Embodiments employing S-IOV are similar to the embodiments illustrated herein depicting DMA blocks implementing SR-IOV PCI virtual functions, except the DMA blocks implement S-IOV PCI virtual functions rather than SR-IOV PCI virtual functions.

Network controller 106 further includes a set of n egress queues for each tenant VM, as depicted by egress queues 152, 154, 156, 158, 160, 162, 164, and 166. Each of egress queues 152, 154, 156, 158, 160, 162, 164, and 166 feeds into a respective packet scheduler 168, also labeled Packet Scheduler Node 0, Node 1, Node 2 . . . Node n. VM schedulers 170 and 172 implement respective scheduling algorithms to pull work elements associated with packets from egress queues 152, 154, 156, 158, 160, 162, 164, and 166 and place them in a network egress queue 174, which has an associated egress buffer 175. Processing of the work elements in egress queue 174 results in packets defined by DMA descriptors in the work elements being copied from packet buffers 117 and 137 in egress buffer 175 using DMA blocks 148 and 150. Schedule packets placed in egress buffer 175 are then sent outbound from a network port 176 onto a network in the scheduled egress order.

Under the software-based QoS traffic classification scheme implemented by architecture 100, packets are classified into QoS traffic classes based on policies defined in traffic classifier policies 118 and 138. The QoS traffic classification implemented by the traffic classifier policies generally may include corresponding QoS policies under which certain traffic classes are prioritized over other traffic classes. In one embodiment, a weighted round-robin scheduling algorithm is implemented to select when packets from the different egress queues are scheduled for outbound transfer onto the network. Under a weighted round-robin scheme, higher weighting is applied to queues for higher QoS (higher priority) traffic classes relative to queues for lower QoS (lower priority) traffic classes. In addition to weighted round-robin, other types of scheduling algorithms may be implemented.

One problem with the prior art scheme of FIG. 1 is the QoS traffic classification is effected by the software running in the tenant VMs, meaning the tenants are managing QoS for the traffic flows generated by the applications running in the tenant VMs. Generally, a given tenant will not be aware of other traffic generated by other tenants in the data center, and oftentimes will not be aware of the traffic being generated by other tenant VMs that are leased by the given tenant. In contrast, the data center operator, through various mechanisms, has visibility of traffic flows within the data center, and can identify through machine and/or human observation where problems such as bottlenecks and/or buffer overfills are occurring or may occur. Under embodiments disclosed herein, the data center operator is enabled to effect QoS traffic classification of packet flows using platform hardware (e.g., network controllers) used to host the tenant VMs. During ongoing run-time operations, the data center operator may dynamically adjust the traffic classification policies used by individual network controllers, enabling the operator to better manage traffic flows within the data center. In practice, the traffic classification policies may be provided by one or more of the data center operator, a management entity of the data center, and an orchestrator entity of the data center.

Figure 2:
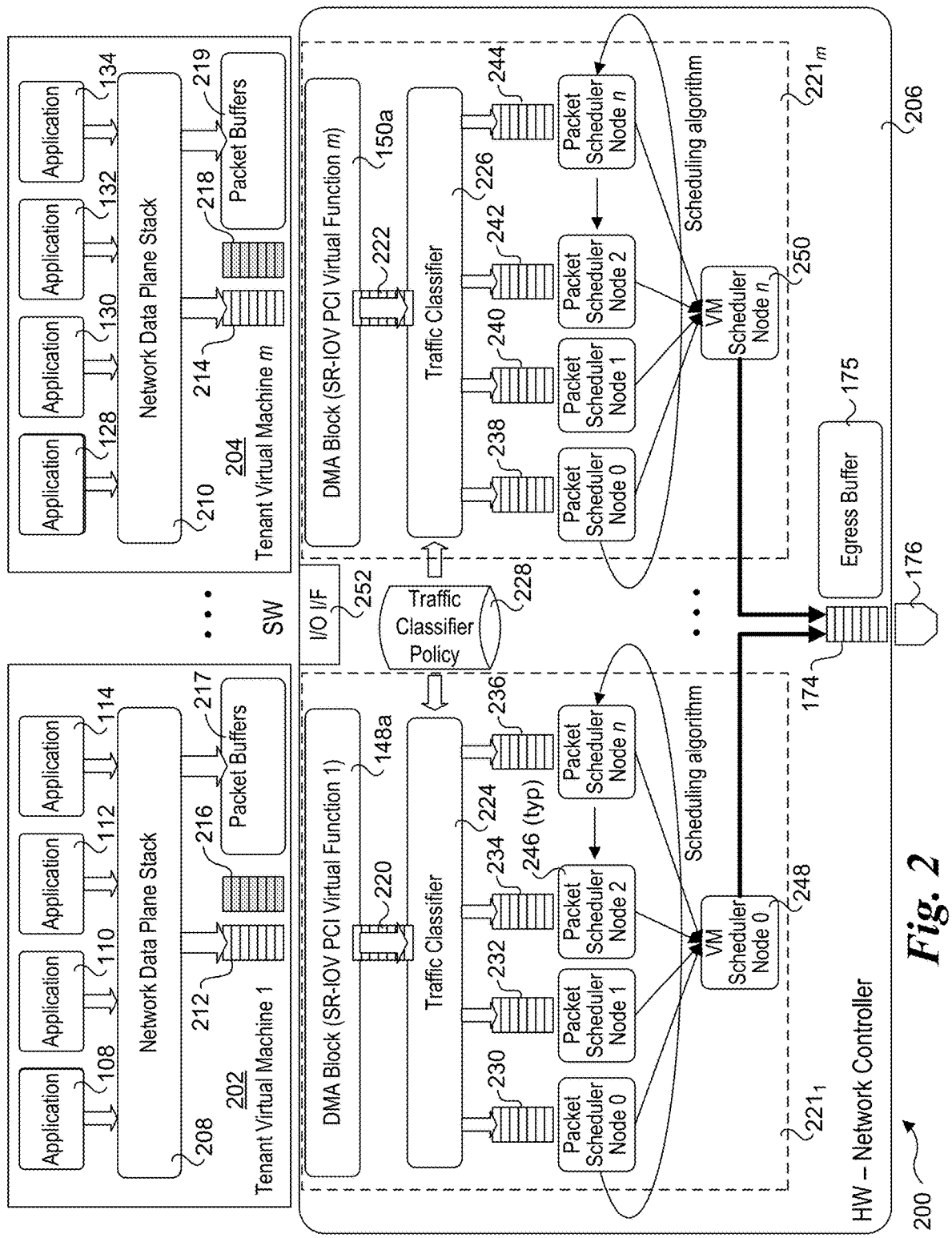
FIG. 2 is a schematic drawing of an architecture corresponding to an embodiment in which QoS traffic classification is performed in platform hardware by a network controller using traffic policies that are set by one or more of a data center operator, a management entity, and an orchestrator entity of the data center.

FIG. 2 shows an architecture 200 corresponding to an embodiment in which QoS traffic classification is performed in platform hardware by a network controller using traffic policies that are set by one or more of a data center operator, a management entity of the data center, and an orchestrator entity of the data center. As before, the architecture includes a software layer including m tenant virtual machines, as depicted by tenant virtual machines 202 and 204, and a hardware layer including a network controller 206.

Each of virtual machines 202 and 204 includes a respective set of applications as depicted by applications 108, 110, 112, 114, 128, 130, 132, and 134. Generally, except for instances where an application would effect traffic classification using an operating system API, the applications in the embodiments in architectures 100 and 200 are the same or similar and are agnostic to how packets containing data generated by the applications are classified. Virtual machines 202 and 204 further include a respective network data plane stack 208 and 210, a respective work submission queue 212 and 214, a respective work completion queue 216 and 218, and respective set of one or more packet buffers 217 and 219.

Figure 2A:
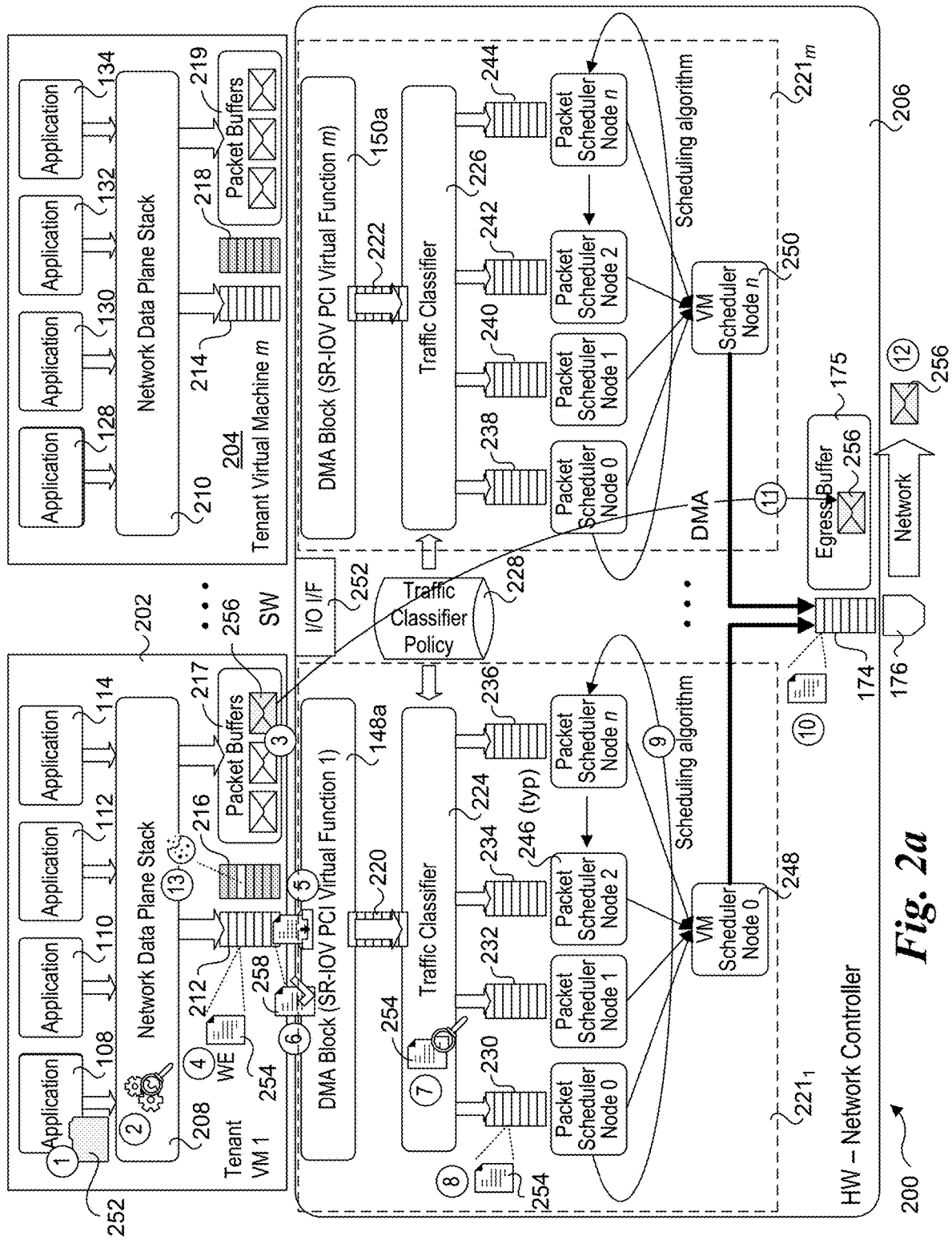
FIG. 2a is a schematic drawing illustrating operations associated with the flowchart of FIG. 3 being implemented on the architecture of FIG. 2.

Network controller 206 includes a plurality of circuit blocks that are replicated to produce a number of circuit block 221 instances, each having a similar configuration. In the embodiments of FIGS. 2 and 2a, there are m replicated circuit blocks $221_1 \ldots 221_m$. Each circuit block 221 instance includes a respective DMA block that implements a respective SR-IOV PCI (Peripheral Component Interconnect) virtual function for each of the m tenant VMs, as depicted by DMA blocks 148a and 150a. Each circuit block 221 instance also includes a respective traffic classifier, classifier input queue, sets of egress queues, packet schedulers and a VM scheduler is provided for each of the m tenant VMs, as depicted by traffic classifiers 224 and 226, classifier input queues 220 and 222, egress queues 230, 232, 234, 236, 238, 240, 242, and 244, node packet schedulers 246, and VM schedulers 248 and 250. The traffic classifiers are configured to classify packets based on classification rules contained in traffic classification policy 228.

Network controller 206 further includes an Input/Output (I/O) interface 252. In one embodiment I/O interface 252 comprises a PCIe interface. Other current and future I/O interfaces and associated protocols also may be used, including future generations of PCIe interfaces and protocols.

Generally, the classification rules used for traffic classification policy 228 may be pre-defined and/or may be dynamically updated during run-time operations. In addition, new traffic classification rules may also be generated on the network controller itself as new traffic flows are created and completed.

VM schedulers 248 and 250 and node packet schedulers 246 implement a respective scheduling algorithm for each replicated circuit block that is used for scheduling transmission of packets onto the network, which is also referred to as transmission (Tx) scheduling. In one embodiment, the VM schedulers 248 and 250 occupy a logical layer in an overall Tx scheduler scheme employing multiple layers. In one embodiment the layers include a queue (leaf node) layer, a Traffic Class layer and a VM scheduler layer. Practically speaking, there is no "VM Scheduler Node" per se, but rather a scheduler node that may contain a policy that applies to the VM associated with the replicated circuit block.

As before, network controller 206 further includes a network egress queue 174 and associated egress buffer 175, and a network port 176. It is noted that while a single network port is shown in the drawings herein, the teachings and principles of the embodiments herein may be applied to network controller with multiple network ports in a similar manner.

With reference to flowchart 300 of FIG. 3 and FIG. 2a, the operation of architecture 200 proceeds as follows, according to one embodiment. In the following description, the encircled numbers adjacent to the flowchart blocks in FIG. 3 are also shown in FIG. 2a to illustrate where (at which software and hardware components) the corresponding operations are performed in FIG. 2a.

The process begins in a block 302 in which an application running in a tenant VM generates data to be sent to a network destination and submits a network transfer request to an operating system (OS) running on the tenant VM. In the example of FIG. 2a, the data corresponds to a file 252 that is to be transferred over the network to a recipient that is one of running in another tenant VM (or otherwise hosted by another VM or container) within the data center or the data is destined for a recipient external to the data center. For example, under a common usage scenario a data center operator, such as Amazon, provides Platform as a Service (PaaS) and Infrastructure as a Service (IaaS) services to various tenants that lease platform hardware and infrastructure resources from Amazon. Such tenants may include various e-commerce site operators using e-commerce hosted services provide through Amazon Web Services (AWS), under which data is typically exchanged between servers (data center hosts platforms) that are leased through AWS and customer computers that are external to the AWS data center. Another example is a video service such as Netflix, which is Amazon's largest customer and uses IaaS services provided by Amazon to service millions of customers (noting that Netflix uses a separate content delivery network to stream the actual video content). It is further noted that data that is sent between data center host and clients external to the data center may pass through one or more data center servers before being sent outbound from the data center.

Generally, the operating system will provide one of more APIs (Application Program Interfaces) supporting network services to enable applications running on the application to send data (traffic) to a network destination. In the embodiments herein, the network services employ the use of a network data plane stack, such as depicted by network data plane stacks 208 and 210 in the Figures herein. In one embodiment, the network data plane stack is implemented as part of the Data Plane Data Kit (DPDK) open source library developed by INTEL® Corporation. However, this is merely an exemplary implementation, as network data plane stacks that are implemented as part of other network services software, whether proprietary or open source, may also be used.

During a second operation performed in a block 304, the operating system passes the data requested to be transferred over the network to the network data plane stack, which looks up the destination address and encapsulates the data into one or more packets, with each packet including a packet header and a data payload. Techniques for packetization of data into packets is well-known in the networking arts, and various network protocols may be used, including but not limited to TCP/IP (Transmission Control Protocol over Internet Protocol), UDP (User Datagram Protocol), HTTP (Hypertext Transport Protocol), FTP (File Transfer Protocol), etc. As will be recognized by those skilled in the networking arts, the packets may be encapsulated using a stack of network protocols (e.g., HTTP over TCP/IP). During a third operation the packets that are generated by the network data plane stack are buffered in a packet buffer allocated for network communication by the operating system, such as depicted by a packet 256 that is written to one of packet buffers 217. These packet buffers are software-based buffers implemented in system memory, and may be dynamically created and released during ongoing operations.

In connection with generating packets, corresponding Work Elements (WEs) are generated by the network data plane stack during a fourth operation, as depicted in a block 306. Generally, a given WE may correspond to a single packet or a sequence of packets, depending on the particular implementation, noting a given implementation may support WEs for both single packets and sequences of packets. The WEs are added to the work submission queue for the tenant VM. In FIG. 2a, this is depicted by a WE 254 that is added to work submission queue 212.

Generally, a work submission queue may be implemented using various types of queue data structures, such as an array, linked list, etc. In one embodiment, the work submission queue is implemented as a circular First-in, First-out (FIFO) queue. A circular FIFO uses head and tail pointers to track what "slot" to write to next (pointed to by the tail pointer) and what is the next slot to pull or read data from (pointed to by the head pointer). Mechanism are also provided to ensure the tail pointer doesn't wrap around and overwrite data pointed to by the head pointer.

In one embodiment, each of the queues in architecture 200 are circular FIFO queues. For illustrative purposes, data is added to the "top" of the queue and read from the bottom of the queue in the Figures herein. In actual practice, once data is written to a circular FIFO queue it is not actually moved through the queue—rather, the tail pointer is advanced as each new entry is written to the queue, and the head pointer is advanced as each entry is pulled or read from the queue.

Figure 4:
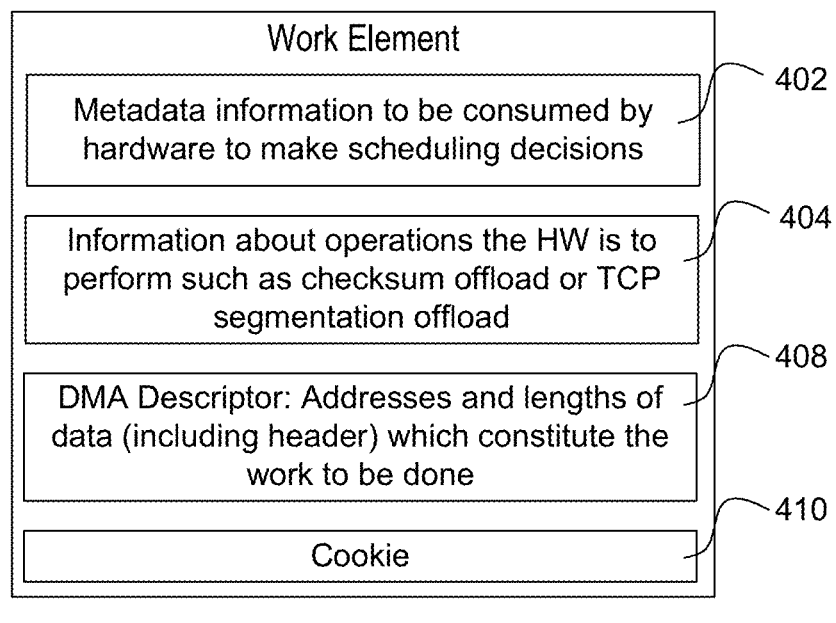
FIG. 4 is a block diagram illustrating an exemplary set of fields and data in a work element, according to one embodiment.

One embodiment of a work element 400 is shown in FIG. 4. Work element 400 includes a metadata field 402 containing information to be consumed by hardware (e.g., the network controller) to make scheduling decisions. Generally, this metadata information may include one or more of packet header information (e.g., selected fields, such as source and destination addresses, transport protocols, etc., or n header fields used for n-tuple flow classification and the like), flow identifier (ID) hints, or other types of data that may be implemented by the traffic classifier to classify the packet flow associated with the work element.

Work element 400 also includes a field 404 containing information about operations the hardware is to perform, such as a checksum offload or TCP segmentation offload. The information in this field will generally depend on the particular implementation. In some implementations, field 404 may be blank for some packets or otherwise not used. Work element 400 further includes a DMA descriptor 408. The DMA descriptor includes the address(es) and length(s) of data, including the packet header, which constitute the work to be done. For example, for a single packet that DMA descriptor may include the virtual memory address at which the packet is stored in a packet buffer in system memory (e.g., one of packet buffers 217 or 219), along with the length of the packet (including its header). The DMA descriptor may also correspond to a sequence of two or more packets.

Work element 400 further includes a "cookie" 410. The cookie is used as an identifier in connection with indicating work activities relating to the processing of work elements have been completed, as discussed below.

Returning to flowchart 300 of FIG. 3 and FIG. 2a, during a fifth operation the network controller fetches the next WE from the work submission queue using a DMA operation and the WE is queued in the traffic classifier input queue, as depicted in a block 308. As WEs are processed, the head pointer is advanced, pointing to the next WE to be processed. In one embodiment, a "doorbell" scheme is used that informs the network controller when new work elements are requested to be worked on (these may also be referred to a Work Requests or WRs). By using a doorbell scheme, the network controller can fetch WEs from the work submission queue when it has room in its traffic classifier input queue. This prevents the traffic classifier input queue from being overfilled, and guarantees that the network controller has room for storing the WE. In one embodiment, in connection with fetching the WE, the WE (or information identifying the WE) is written back to the work submission queue marking the descriptor as being done. This is depicted by a sixth operation in FIG. 2a, and shown as a WE 258.

In further detail, as work element 254 reaches the "bottom" of the queue (which is effected by the head pointer pointing to the FIFO slot in which work element 254 was written), traffic classifier 224 receives a doorbell ring informing it that a work element is requested to be worked on. Traffic classifier 224 then uses DMA facilities provided by DMA block 148a to send a copy of work element 254 from work submission queue 212 to the "top" of traffic classifier input queue 220. The DMA facilities write the copy of work element 254 to an address in traffic classifier input queue 220 pointed to by its tail pointer. By using direct memory access, this data transfer is performed without requiring any processor core cycles. Since the WE is fetched or pulled (retrieved) from the work submission queue using a DMA operation, the software managing the work submission queue is not involved in the data transfer and thus the WE writeback is performed to indicate the WE has been fetched.

As an alternate approach, software may push WE's to the network controller using a DMA write to the traffic classifier input queue. However, the doorbelling and DMA WE fetch approach is preferred, since the network controller can determine when to fetch more WEs, preventing the possibility of overwritten WEs in the traffic classifier input queue.

Next, during a seventh operation performed in a block 310, the traffic classifier parses the WE metadata to determine the QoS Traffic Class (TC) for the packet flow to which the packet belongs using applicable traffic classification policy rules. Generally, packets for a given packet flow have the same destination address (along with other packet header data) and will be classified to the same TC. In cases where the packet is the first packet for a given packet flow, there will be no existing flow classification record or entry for that traffic flow. Accordingly, a QoS traffic class for the packet will be determined (by processing the WE metadata), and a corresponding record or entry will be added to the traffic classifier's classification table (or other data structure used to store packet flow classification data). The new record or entry may then be used to classify subsequent packets belonging to the same packet flow to the same TC. Various traffic classification schemes may be used, such as those known in the art, with the particular traffic classification scheme being dependent on the particular implementation.

In connection with processing the WE, during in eight operation performed in a block 312, the classified WE is placed in the egress queue corresponding to the QoS traffic class for the packet. In the present example of FIG. 2a, WE 254 is depicted as being added to egress queue 230.

During a ninth operation, as depicted by in a block 314, the VM scheduler uses a scheduling algorithm to select a "winning" egress queue and pulls the WE from the bottom of the queue (the current location pointed to by the head pointer) and adds it to the egress buffer queue. As discussed above, various types of scheduling algorithms may be used, such as a weighted round robin scheme. Under the various types of schemes, the algorithm will select an egress queue to schedule for egress—this selected egress queue is considered to have won the current scheduling wound, and thus is referred to as the winning queue.

In one embodiment, a multi-layer Tx scheduler scheme is used, such as discussed above under which scheduling factors are implemented at multiple layers. In one embodiment, in connection with this scheduling operation, the network controller verifies it has available TC credits for the traffic class corresponding to the winning egress queue. For example, in some network or fabrics, a credit-based scheme is used for traffic flows to ensure there is adequate buffer space at switches or between endpoints of a single link to prevent buffers from being overfilled, resulting in dropped packets. Such credit-based schemes may use virtual "lanes" or "channels" associated with respective traffic classes, allocating credits on a per-TC basis. Under one embodiment, egress queues corresponding to traffic classes that have insufficient TC credits are ineligible for scheduling.

During tenth and eleventh operations implemented in a block 316, the DMA descriptor in the WE is processed, resulting in the packet header and payload for one or more packets associated with the WE being DMA'ed to the egress buffer. In the example of FIG. 2a, a copy of packet 256, including both its header and payload is read from its system memory location in one of packet buffers 217 and written to egress buffer 175 using a DMA operation facilitated by DMA block 148a. In cases under which the DMA descriptor is used to described the location of multiple packets (e.g., a packet sequence), the multiple packets are DMA'ed to the egress buffer.

After DMAing the data, the network controller will determine which queue resource to use, perform work operations such as checksum offload or TSO (if any) defined in the WE, and then send the packet outbound to the network via the network port. This is depicted in a block 318 of flowchart 300 and a twelfth operation in FIG. 2a.

Once the packet has been sent onto the network, the work related to its work element has been completed. Accordingly, in connection with a thirteenth operation performed in a block 320, the WE cookie is DMA'ed from the network controller into work completion queue 216. This indicates to software that the work associated with the WE has been completed; as a result, the software may free any buffers that we allocated for the WE. It is further noted that the operations of blocks 318 and 320 may overlap or otherwise be performed in parallel.

In parallel with the operations depicted in FIG. 2a for tenant VM 1, similar operations are performed in parallel for each of the other tenant VMs. In one embodiment, components depicted as the DMA blocks, traffic classifiers and associated input and egress queues, and packet schedulers and VM schedulers are implemented in hardware using embedded logic and the like. For example, the logic may be implemented as an array of logic gates configured to perform predetermined functions using techniques that are known in the art. Optionally, all of a portion of the logic may be configured using programming Field Programmable Gate Array (FPGA) circuitry.

In one embodiment, the same set of embedded hardware logic is replicated for each of the m virtual machines. For example, if m=8, there are 8 instances of the embedded hardware logic implemented on the network controller. Other values of m may also be used, such as 4, 6, 10, 12, etc. It is further noted that a network controller configured with m instances of the embedded hardware logic may be used to support less than m tenant virtual machines, wherein one or more of the hardware logic instances will not be used. Generally, during platform initialization the DMA blocks and associated embedded hardware logic will be configured to be implemented for each tenant VM that is to run on the host platform.

Generally, the principles and techniques described herein may be implemented using multiple tenant virtual machines, or using multiple tenant containers. Moreover, both Type-1 and Type-2 hypervisor implementations are supported, as well as different container-based implementations.

Figure 5:
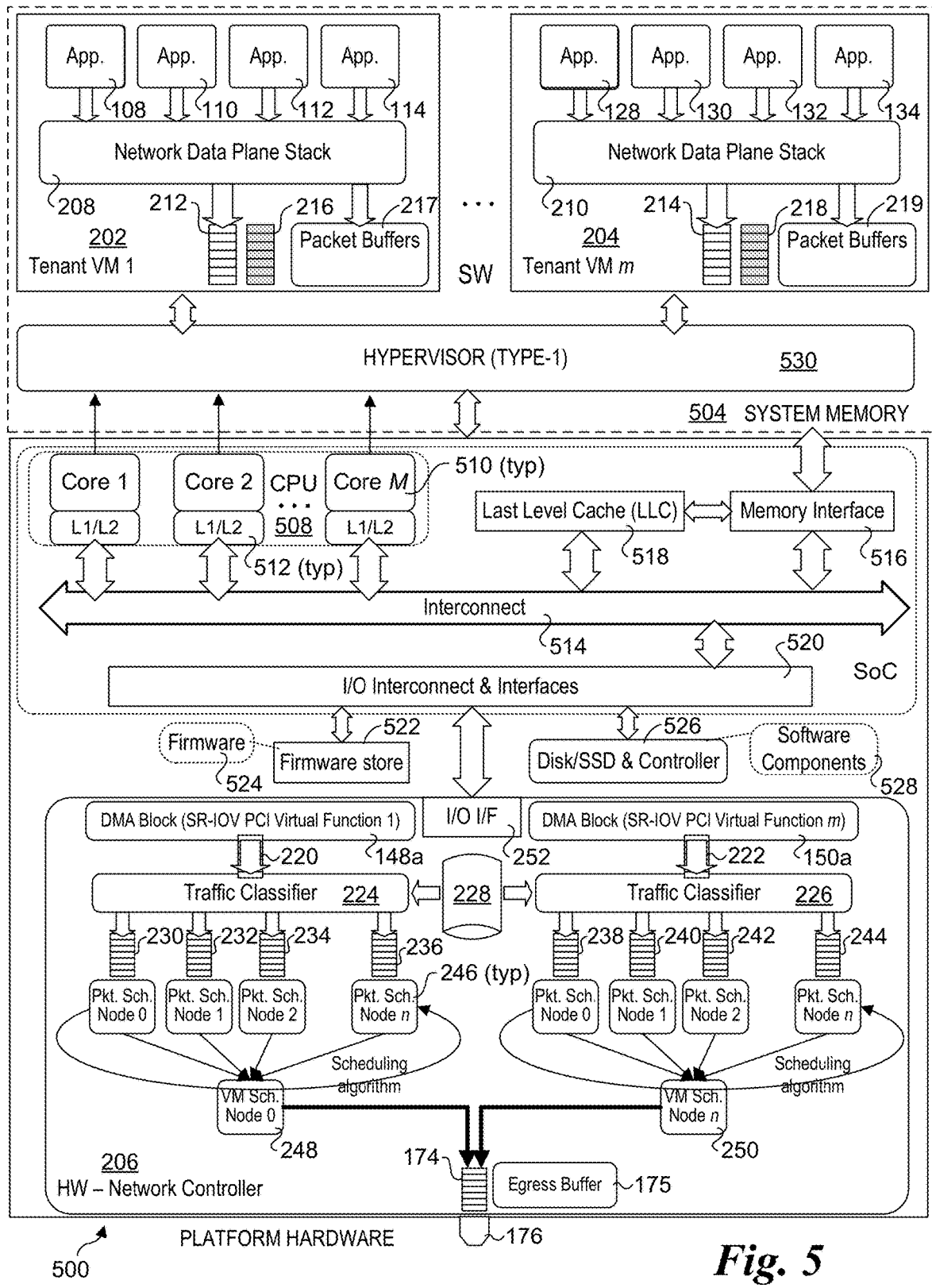
FIG. 5 is a schematic diagram of a system including a compute platform including the network controller of FIGS. 2 and 2a and configured to host a plurality of virtual machines in which software-based data plane operations are implemented, according to one embodiment, employing a Type-1 hypervisor.

One embodiment of a Type-1 hypervisor implementation architecture 500 is shown in FIG. 5. As before, architecture 500 includes a hardware layer in the lower portion of the diagram including platform hardware 502, and a software layer that includes software components running in system memory 504.

Platform hardware 502 includes a processor 506 having a System on a Chip (SoC) architecture including a central processing unit (CPU) 508 including M processor cores 510, each coupled to a Level 1 and Level 2 (L1/L2) cache 512. Each of the processor cores and L1/L2 caches are connected to a interconnect 514 to which each of a memory interface 516 and a last level cache (LLC) 518 is coupled, forming a coherent memory domain. Memory interface is used to access system memory 504 in which various software components are loaded and run via execution of associated software instructions on processor cores 510.

Processor 506 further includes an Input/Output (I/O) interconnect hierarchy, which includes one or more levels of interconnect circuitry and interfaces that are collectively depicted as I/O interconnect & interfaces 520 for simplicity. Various components and peripheral devices are coupled to processor 506 via respective interfaces (not separately shown), including a network controller 206, a firmware storage device 522 in which firmware 524 is stored, and a disk drive or solid state disk (SSD) with controller 526 in which software components 528 are stored. Optionally, all or a portion of the software components used to implemented the software aspects of embodiments herein may be loaded over a network. In one embodiment, firmware 524 comprises a BIOS (Basic Input Output System) portion and additional firmware components configured in accordance with the Universal Extensible Firmware Interface (UEFI) architecture; the combination of BIOS and UEFI firmware is depicted herein as BIOS/UEFI firmware.

During platform initialization, various portions of firmware 524 (not separately shown) are loaded into system memory 504, along with various software components. In architecture 500 of FIG. 5 the software components include a Type-1 hypervisor 530, also known as a "bare-metal" hypervisor. Optionally, a Type-2 hypervisor may be used (not shown). One of the primary differences between a Type-1 hypervisor and a Type-2 hypervisor is the Type-2 hypervisor is implemented as an application running on host operating system, while in a Type-1 hypervisor the hypervisor runs directly on the platform hardware without a host operating system (i.e., it runs on the "bare metal" of the platform).

Figure 6:
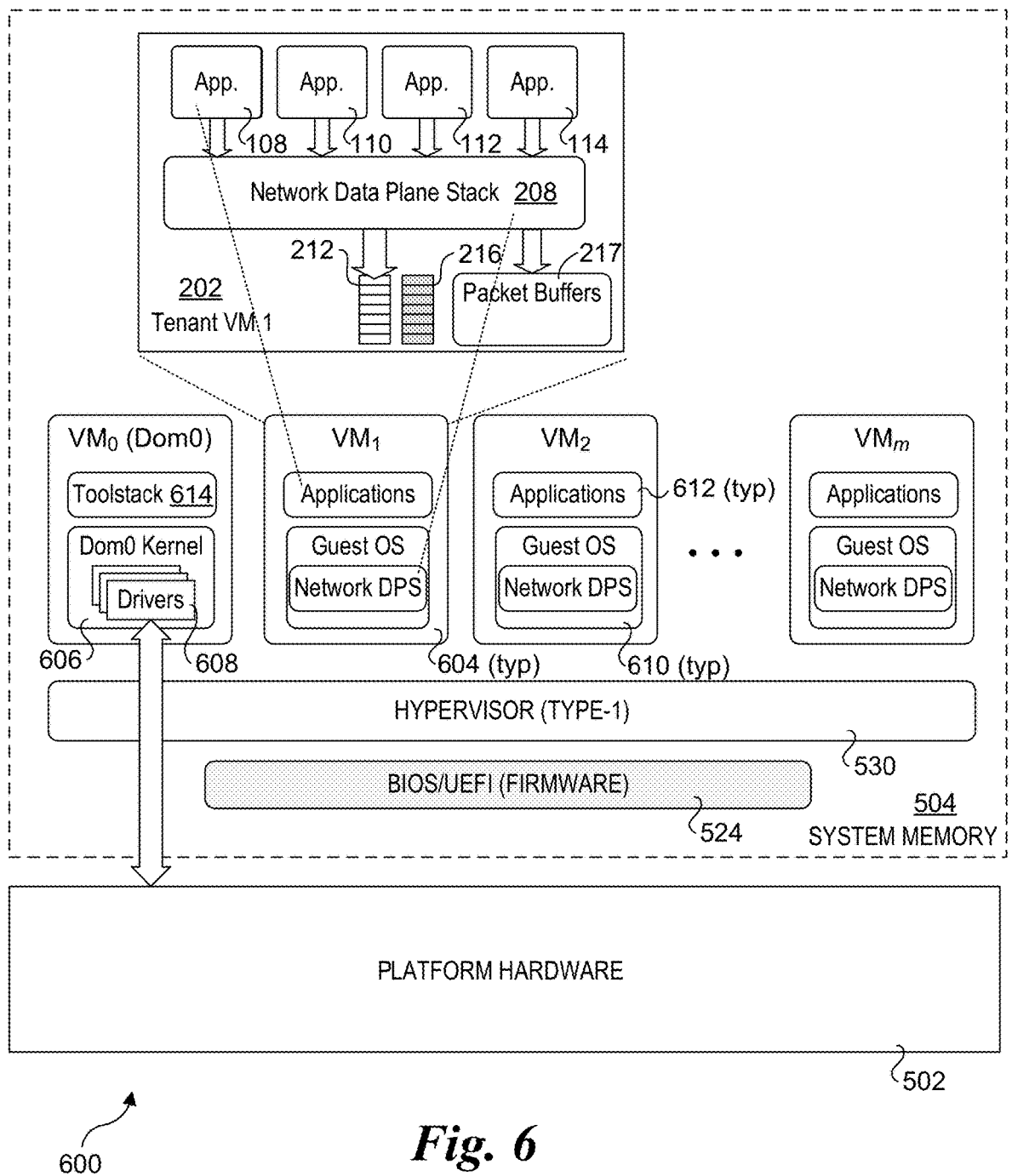
FIG. 6 is a schematic diagram illustrating a software architecture based on a Type-1 hypervisor in accordance with the "Xen" architecture being implemented on the platform hardware of FIG. 5.

In one embodiment, the Type-1 hypervisor is used as part of a Xen Type-1 hypervisor architecture 600, as shown in FIG. 6. Architecture 600 includes a Type-1 hypervisor 602 that is used to host a plurality of virtual machines (VMs) 604, labeled $VM_0$-$VM_m$. Under the Xen architecture the first $VM_0$, which is referred to as Dom0 (domain 0), includes a Dom0 kernel 606 including drivers 608. Meanwhile, the other VMs $VM_1$-$VM_m$ host a respective guest OS 610 used to run applications 612.

In one embodiment, software code or a software component in Dom0 kernel 606 performs some of the operating system functions illustrated in FIGS. 2, and 2a and described in portions of flowchart 300 discussed above. Optionally, software code or a software component depicted as toolstack 614 may be used to perform some of these operating system functions.

FIG. 6 further shows details of tenant VM 1 (VM 202) mapped to corresponding components illustrated for $VM_1$. For example, network data plane stack 208 (network DPS) is implemented as part of guest OS 610. Each of the other VMs $VM_2$-$VM_m$ have similar configurations.

Other embodiments support container-based software execution environments, under which applications are executed in "containers." The use of container-based execution environments has recently seen widespread adoption in data centers, such as containers based on DOCKER™. (It is noted that other container-based implementation that do not use DOCKER™ may also be deployed.)

Figure 7:
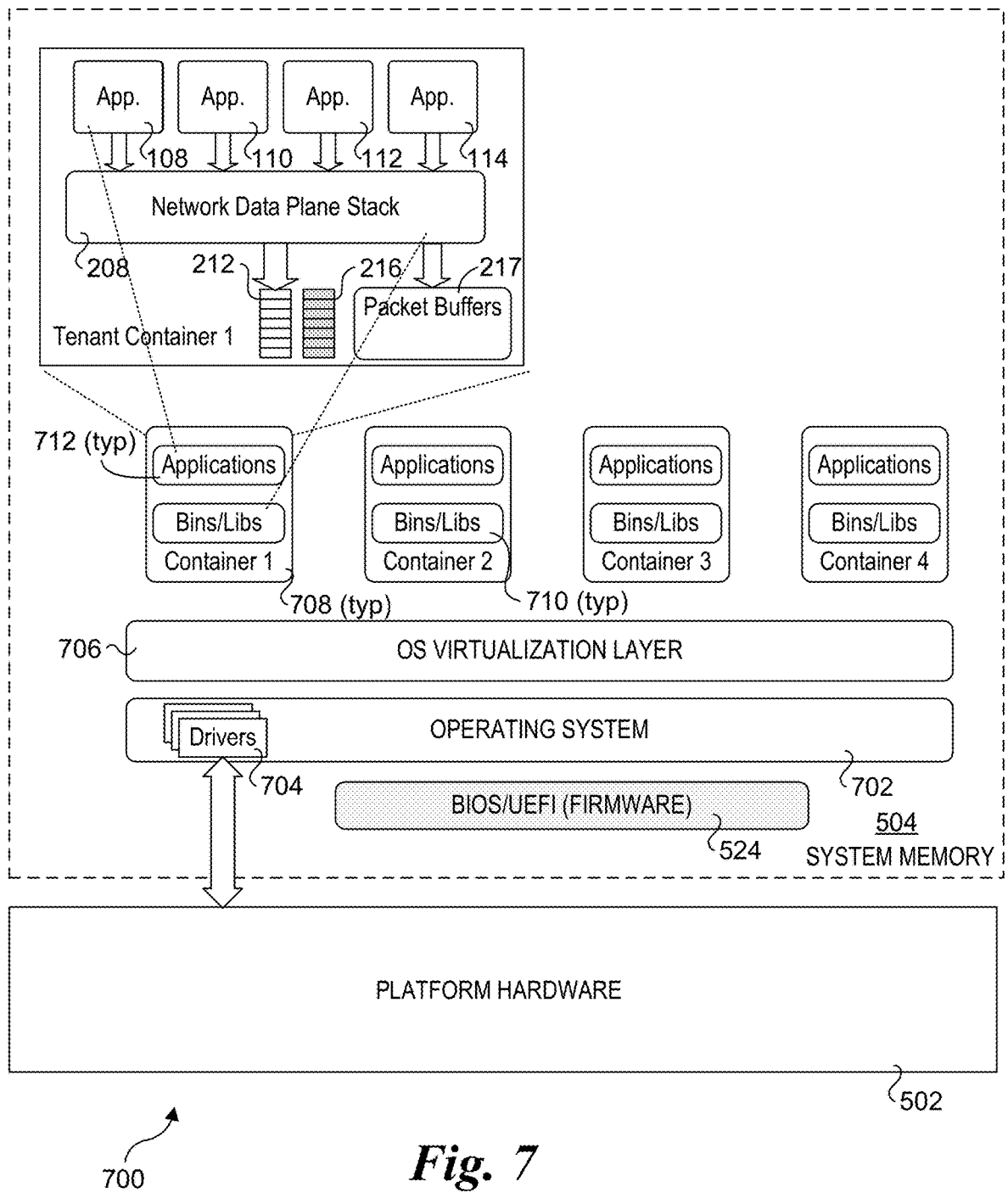
FIG. 7 shows a software architecture corresponding to a container-based implementation environment in which applications are run in containers being implemented on the platform hardware of FIG. 5.

An exemplary container-based software execution environment is shown in software architecture 700 of FIG. 7. Software architecture 700 includes an operating system 702 including drivers 704 that enable OS 702 to interface with platform hardware 502. OS 702 may also interact with platform hardware 502 via BIOS/UEFI firmware 524. An OS virtualization layer 706 is disposed above OS 702. Under DOCKER™ terminology this is called the DOCKER™ engine, while other container technologies use other terminology. The OS virtualization layer, in combination with the operating system, is used to host multiple containers 708. Each container includes a set of binary executables and libraries (Binaries/Libraries) 710 that are used to facilitate execution of one or more applications 712 within the container.

FIG. 7 further shows an instance of a tenant container (1) including components similar to tenant VM 202 mapped to Binaries/Libraries 710 and applications 712. In the illustrated configuration, Binaries/Libraries 710 include software code (or object code) for implementing the functionality of network data plane stack 208.

The principles and techniques of the foregoing embodiments provides several advantages over conventional schemes, such as the prior art scheme of FIG. 1. By implementing the QoS traffic classification in hardware using policies managed by the data center operator rather than having this done in software by each tenant, the data center operator can better manage network control plane operations. Moreover, the egressing of packets is offloaded to the network controller, which enables the software layer to submit work requests using a work queue that doesn't experience any blocking. For example, as work elements are fetched from the work submission queue, the network controller immediately performs a WE writeback that enables reuse of the queue slot containing the WE. Meanwhile, egress of packets relating to the work elements being processed by the network controller may be performed out-of-order relative to the order the WEs were added to the work submission queue, noting that packet egress is stilled ordered within any given traffic class. Thus, traffic classes with low bandwidth do not block work from traffic classes with higher bandwidth.

Further aspects of the subject matter described herein are set out in the following numbered clauses:

1. A method performed on a compute platform having a network controller coupled to a network and running a plurality of applications in one of a plurality of virtual machines or containers hosted by the compute platform, the method comprising:

performing, on the network controller, Quality of Service (QoS) traffic classification to classify packets encapsulating data generated by the plurality of applications into QoS traffic classes, wherein packets belonging to a given traffic flow are classified to the same QoS traffic class;

scheduling, on the network controller, egress of classified packets to be transmitted outbound from the network controller onto the network, wherein the classified packets are scheduled for egress as a function of QoS traffic classifications of the packets; and transmitting packets that are scheduled for egress onto the network via the network port.

2. The method of clause 1, wherein the compute platform is located in a data center, and wherein packets are classified into QoS traffic classes on the network controller using QoS traffic classifier policies provided by one or more of a data center operator, a management entity of the data center, and an orchestrator entity of the data center.

3. The method of clause 2, further comprising:

updating, during runtime operations, one or more QoS traffic classifier rules, wherein at least a portion of the one or more QoS traffic classifier rules is provided as an input to the network controller by one or more of a data center operator, a management entity of the data center, and an orchestrator entity of the data center; and employing the one or more QoS traffic classifier rules that are updated to classify packets into QoS traffic classes.

4. The method of any of the preceding clauses, further comprising:

for each of at least two of the plurality of virtual machines or containers hosted by the compute platform, implementing a respective work submission queue;

receiving data to be transmitted to a destination via the network;

packetizing the data into a plurality of packets and buffering the plurality of packets in one or more software memory buffers;

generating a plurality of work elements, each work element associated with one or more of the plurality of packets and including metadata to be used to facilitate QoS traffic classification of the one or more of the plurality of packets associated with the work element; and queuing the plurality of work elements in the work submission queue.

5. The method of clause 4, further comprising:

parsing, on the network controller, the metadata in a work element to determine a QoS traffic class to which the one or more packets associated with the work element are classified;

and queuing the work element in an egress queue associated with the traffic class.

6. The method of clause 4 or 5, wherein a work element includes a direct memory access (DMA) descriptor identifying a memory location in a software memory buffer for each of the one or more of the plurality of packets associated with the work element and a length of that packet, the method further comprising:

employing the DMA descriptor to copy or write data corresponding to the one or more packets associated with the work element from the software memory buffer to an egress buffer on the network controller using a DMA operation.

7. The method of clause 6, wherein the DMA operation is facilitated by a DMA block on the network controller implementing a Single Root Virtual I/O (SR-IOV) Peripheral Component Interconnect (PCI) virtual function.

8. The method of clause 6, wherein the DMA operation is facilitated by a DMA block on the network controller implementing a Scalable IOV (S-IOV) Peripheral Component Interconnect (PCI) virtual function.

9. The method of any of clauses 4-8, further comprising:
fetching, via the network controller, a work element from the work submission queue; and
writing back data to the work submission queue identifying the work element has been fetched from the work submission queue.

10. The method of any of clauses 4-9, wherein each work element includes an identifier, further comprising:
implementing a respective work completion queue for each of the at least two of the plurality of virtual machines or containers hosted by the compute platform;
completing work on the network controller defined by a work element; and
using a direct memory access (DMA) operations to add an entry including the identifier for the work element to the work completion queue.

11. The method of any of clauses 4-10, further comprising:
submitting work elements into the work submission queue using an original order; and
performing work defined by the work elements on the network controller out-of-order relative to the original order.

12. A network controller, comprising:
a plurality of replicated circuit blocks, each including,
a Direct Memory Access (DMA) block;
a traffic classifier;
a plurality of egress queues; and
one or more scheduler components; and
a network port, having an associated egress buffer,
wherein the network controller is configured to be implemented in a compute platform, and wherein during operation the network port is coupled to a network and wherein each replicated circuit block is configured to,
effect Quality of Service (QoS) traffic classification of packet flows corresponding to packets generated by software running on a respective virtual machine or running in a respective container on the compute platform;
schedule egress of packets to be sent outbound from the network port into the network based on the QoS traffic classification of the packets; and
transmit packets that have been scheduled for egress outbound from the network port into the network.

13. The network controller of clause 12, wherein the network controller is configured to classify the packet flows into QoS traffic classes using QoS traffic classifier policies defined by one or more of a data center operator, a management entity of the data center, and an orchestrator entity of the data center.

14. The network controller of clause 12 or 13, wherein a replicated circuit block is configured to:
one of receive or fetch a work element from a work submission queue implemented in system memory in the compute platform, the work element associated with one or more packets and including metadata to facilitate QoS traffic classification of the one or more packets associated with the work element;
parse the metadata in a work element to determine a QoS traffic class to which the one or more packets associated with the work element are classified; and
queue the work element in an egress queue associated with the traffic class.

15. The network controller of clause 14, wherein the replicated circuit block is further configured to:
implement a scheduling algorithm used to select a work element from one of the plurality of egress queues during each of a plurality of scheduling rounds; and
forward the work element that is selected the egress buffer.

16. The network controller of clause 14 or 15, wherein the replicated circuit block is configured to:
fetch a work element from the work submission queue using a first DMA operation; and
write back data to the work submission queue identifying the work element has been fetched from the work submission queue using a second DMA operation.

17. The network controller of any of clauses 14-16, wherein a work element includes a DMA descriptor identifying a location in a memory buffer in the system memory for each of the one or more packets associated with the work element and a length of that packet, and wherein the network controller is further configured to:
employ the DMA descriptor to copy or write data corresponding to the one or more packets associated with the work element from the memory buffer in the system memory to the egress buffer on the network controller using a DMA operation.

18. The network controller of any of clauses 12-17, wherein the DMA block for each of the replicated circuit blocks is configured to implement a Single Root Virtual I/O (SR-IOV) Peripheral Component Interconnect (PCI) virtual function.

19. The network controller of any of clauses 12-18, wherein the DMA block for each of the replicated circuit blocks is configured to implement a Scalable IOV (S-IOV) Peripheral Component Interconnect (PCI) virtual function.

20. The network controller of any of clauses 14-19, wherein each work element includes an identifier, and wherein the network controller is further configured to:
complete work defined by a work element; and
add an entry including the identifier for the work element to a work completion queue in system memory using a DMA operation.

21. The network controller of any of clauses 14-20, wherein a replicated circuit block is further configured to:
receive or retrieve work elements from the work submission queue in an original order; and
perform work defined by the work elements out-of-order relative to the original order.

22. A system comprising:
a compute platform, comprising a processor operatively coupled to system memory and having an input/output (I/O) interface;
a network controller, coupled to the processor via the I/O interface and having a network port coupled,
wherein the system is configured to perform operations when installed in a data center and the network port is coupled to a network in the data center including,
host one of a plurality of virtual machines or containers in which a plurality of applications are run;

perform data plane operations via execution of software running in the virtual machines or containers, the data plane operations including encapsulating data generated by the plurality of applications into packets to be sent over the network as traffic flows;

perform control plane operations on the network controller, the control plane operations including performing Quality of Service (QoS) traffic classification to classify the packets to be sent over the network into QoS traffic classes, wherein packets belonging to a give traffic flow are classified to the same QoS traffic class;

schedule egress of classified packets to be transmitted outbound from the network controller onto the network, wherein the classified packets are scheduled for egress as a function of QoS traffic classifications of the packets; and transmit packets that are scheduled for egress onto the network via the network port.

23. The system of clause 22, wherein the system is further configured to:

for each of at least two of the plurality of virtual machines or containers hosted by the compute platform, implement a respective work submission queue;

receive data from one or more applications to be transmitted to a destination via the network;

packetize the data into a plurality of packets and buffer the plurality of packets in one or more software memory buffers;

generate a plurality of work elements, each work element associated with one or more of the plurality of packets and including metadata to be used to facilitate QoS traffic classification of the one or more of the plurality of packets associated with the work element; and queue the plurality of work elements in the work submission queue;

on the network controller, receive or retrieve a work element from a work submission queue;

parse the metadata in the work element to determine a QoS traffic class to which the one or more packets associated with the work element are classified; and queue the work element in an egress queue associated with the traffic class.

24. The system of clause 23, wherein a work element includes a direct memory access (DMA) descriptor identifying a memory location in a software memory buffer for each of the one or more packets associated with the work element and a length of that packet, wherein the network controller includes an egress buffer; and wherein the system is further configured to:

access the DMA descriptor in a work element to copy or write data corresponding to the one or more packets associated with the work element from the software memory buffer in which the one or more packets are buffered to the egress buffer using a DMA operation.

25. The system of clause 24, wherein the system is further configured to:

implement a respective work completion queue in system memory for each of the at least two of the plurality of virtual machines or containers hosted by the compute platform;

complete, on the network controller, work defined by a work element; and add an entry including an identifier for the work element to the work completion queue using a DMA operation.

26. The system of clause 23, wherein the network controller comprises:

a plurality of replicated circuit blocks, each including, a DMA block;

a traffic classifier, configured to perform QoS traffic classification;

a plurality of egress queues; and one or more scheduler components to schedule packets for egress as a function of QoS traffic classifications of the packets.

27. The system of clause 26, wherein the DMA block for each of the replicated circuit blocks is configured to implement a Single Root Virtual I/O (SR-IOV) Peripheral Component Interconnect (PCI) virtual function or a Scalable IOV (S-IOV) PCI virtual function.

28. The system of clause 26, wherein the network controller includes a respective replicated circuit block for each of for each of the at least two of the plurality of virtual machines or containers hosted by the compute platform.

29. The system of any of clauses 26-28, wherein a replicated circuit block is further configured to:

receive or retrieve work elements from the work submission queue in an original order; and perform work defined by the work elements out-of-order relative to the original order.

30. The system of any of clauses 22-29, wherein the network controller is configured to classify the packet flows into QoS traffic classes using QoS traffic classifier policies defined by one or more of a data center operator, a management entity of the data center, and an orchestrator entity of the data center.

31. A network controller, comprising:

a plurality of replicated circuit blocks; and a network port, having an associated egress buffer, wherein the network controller is configured to be implemented in a compute platform, and wherein during operation the network port is coupled to a network and wherein each replicated circuit block includes means for, effecting Quality of Service (QoS) traffic classification of packet flows corresponding to packets generated by software running on a respective virtual machine or running in a respective container on the compute platform;

scheduling egress of packets to be sent outbound from the network port into the network based on the QoS traffic classification of the packets; and transmitting packets that have been scheduled for egress outbound from the network port into the network.

32. The network controller of clause 31, wherein the network controller includes means for classifying the packet flows into QoS traffic classes using QoS traffic classifier policies defined by one or more of a data center operator, a management entity of the data center, and an orchestrator entity of the data center.

33. The network controller of clause 31 or 32, wherein a replicated circuit block includes means for:

receiving or fetching a work element from a work submission queue implemented in system memory in the compute platform, the work element associated with one or more packets and including metadata to facilitate QoS traffic classification of the one or more packets associated with the work element;

parsing the metadata in a work element to determine a QoS traffic class to which the one or more packets associated with the work element are classified; and queuing the work element in an egress queue associated with the traffic class.

34. The network controller of clause 33, wherein the replicated circuit block further includes means for:

implementing a scheduling algorithm used to select a work element from one of the plurality of egress queues during each of a plurality of scheduling rounds; and forwarding the work element that is selected the egress buffer.

35. The network controller of clause 33 or 34, wherein the replicated circuit block includes means for:

fetching a work element from the work submission queue using a first Direct Memory Access (DMA) operation; and writing back data to the work submission queue identifying the work element has been fetched from the work submission queue using a second DMA operation.

36. The network controller of any of clause 33-35, wherein a work element includes a DMA descriptor identifying a location in a memory buffer in the system memory for each of the one or more packets associated with the work element and a length of that packet, and wherein the network controller further includes means for employing the DMA descriptor to copy or write data corresponding to the one or more packets associated with the work element from the memory buffer in the system memory to the egress buffer on the network controller using a DMA operation.

37. The network controller of any of clause 31-36, wherein each replicated circuit block includes a Direct Memory Access (DMA) block for implementing a Single Root Virtual I/O (SR-IOV) Peripheral Component Interconnect (PCI) virtual function.

38. The network controller of any of clause 31-36, wherein each replicated circuit block includes a Direct Memory Access (DMA) block for implementing a Scalable IOV (S-IOV) Peripheral Component Interconnect (PCI) virtual function.

39. The network controller of any of clauses 33-38, wherein each work element includes an identifier, and wherein the network controller further includes means for:

adding an entry including the identifier for the work element to a work completion queue in system memory using a Direct Memory Access (DMA) operation.

40. The network controller of any of clauses 33-39, wherein a replicated circuit block includes means for:

receiving or retrieving work elements from the work submission queue in an original order; and performing work defined by the work elements out-of-order relative to the original order.

Although some embodiments have been described in reference to particular implementations, other implementations are possible according to some embodiments. Additionally, the arrangement and/or order of elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

In the description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

An embodiment is an implementation or example of the inventions. Reference in the specification to "an embodiment," "one embodiment," "some embodiments," or "other embodiments" means that a particular feature, structure, or characteristic described in connection with the embodiments is included in at least some embodiments, but not necessarily all embodiments, of the inventions. The various appearances "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

Italicized letters, such as 'm', 'n', 'M', etc. in the foregoing detailed description are used to depict an integer number, and the use of a particular letter is not limited to particular embodiments. Moreover, the same letter may be used in separate claims to represent separate integer numbers, or different letters may be used. In addition, use of a particular letter in the detailed description may or may not match the letter used in a claim that pertains to the same subject matter in the detailed description.

As discussed above, various aspects of the embodiments herein may be facilitated by corresponding software and/or firmware components and applications, such as software and/or firmware executed by an embedded processor or the like. Thus, embodiments of this invention may be used as or to support a software program, software modules, firmware, and/or distributed software executed upon some form of processor, processing core or embedded logic a virtual machine running on a processor or core or otherwise implemented or realized upon or within a non-transitory computer-readable or machine-readable storage medium. A non-transitory computer-readable or machine-readable storage medium includes any mechanism for storing information in a form readable by a machine (e.g., a computer). For example, a non-transitory computer-readable or machine-readable storage medium includes any mechanism that provides (i.e., stores) information in a form accessible by a computer or computing machine (e.g., computing device, electronic system, etc.), such as recordable/non-recordable media (e.g., read only memory (ROM), random access memory (RAM), magnetic disk storage media, optical storage media, flash memory devices, etc.). The content may be directly executable ("object" or "executable" form), source code, or difference code ("delta" or "patch" code). A non-transitory computer-readable or machine-readable storage medium may also include a storage or database from which content can be downloaded. The non-transitory computer-readable or machine-readable storage medium may also include a device or product having content stored thereon at a time of sale or delivery. Thus, delivering a device with stored content, or offering content for download over a communication medium may be understood as providing an article of manufacture comprising a non-transitory computer-readable or machine-readable storage medium with such content described herein.

Various components referred to above as processes, servers, or tools described herein may be a means for performing the functions described. The operations and functions performed by various components described herein may be implemented by software running on a processing element, via embedded hardware or the like, or any combination of hardware and software. Such components may be implemented as software modules, hardware modules, special-purpose hardware (e.g., application specific hardware, ASICs, DSPs, etc.), embedded controllers, hardwired circuitry, hardware logic, etc. Software content (e.g., data, instructions, configuration information, etc.) may be provided via an article of manufacture including non-transitory computer-readable or machine-readable storage medium, which provides content that represents instructions that can be executed. The content may result in a computer performing various functions/operations described herein.

In addition, embodiments of the present description may be implemented not only within a semiconductor chip but also within machine-readable media. For example, the designs described above may be stored upon and/or embedded within machine readable media associated with a design tool used for designing semiconductor devices. Examples include a netlist formatted in the VHSIC Hardware Description Language (VHDL) language, Verilog language or SPICE language. Some netlist examples include: a behavioral level netlist, a register transfer level (RTL) netlist, a gate level netlist and a transistor level netlist. Machine-readable media also include media having layout information such as a GDS-II file. Furthermore, netlist files or other machine-readable media for semiconductor chip design may be used in a simulation environment to perform the methods of the teachings described above.

As used herein, a list of items joined by the term "at least one of" can mean any combination of the listed terms. For example, the phrase "at least one of A, B or C" can mean A; B; C; A and B; A and C; B and C; or A, B and C.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the drawings. Rather, the scope of the invention is to be determined entirely by the following claims, which are to be construed in accordance with established doctrines of claim interpretation.

What is claimed is:

1. A method performed on a compute platform having a network controller coupled to a network and running a plurality of applications in one of a plurality of virtual machines (VMs) or containers hosted by the compute platform, the network controller comprising a plurality of replicated circuit blocks, wherein each of the plurality of replicated circuit blocks is configured to perform the method comprising:

performing Quality of Service (QoS) traffic classification to classify packets encapsulating data generated by one or more applications running on a respective VM or running in a respective container into QoS traffic classes, wherein packets belonging to a given traffic flow are classified to the same QoS traffic class;

scheduling, for the respective VM or container, egress of classified packets generated by one or more applications running in the VM or container and to be transmitted outbound from the network controller onto the network, wherein the classified packets are scheduled for egress as a function of QoS traffic classifications of the packets; and transmitting packets that are scheduled for egress onto the network via the network port.

2. The method of claim 1, wherein the compute platform is located in a data center, and wherein packets are classified into QoS traffic classes on the network controller using QoS traffic classifier policies provided by one or more of a data center operator, a management entity of the data center, and an orchestrator entity of the data center.

3. The method of claim 2, further comprising:

updating, during runtime operations, one or more QoS traffic classifier rules, wherein at least a portion of the one or more QoS traffic classifier rules is provided as an input to the network controller by one or more of a data center operator, a management entity of the data center, and an orchestrator entity of the data center; and employing the one or more QoS traffic classifier rules that are updated to classify packets into QoS traffic classes.

4. The method of claim 1, further comprising:

for each of at least two of the plurality of virtual machines or containers hosted by the compute platform, implementing a respective work submission queue;

receiving data to be transmitted to a destination via the network;

packetizing the data into a plurality of packets and buffering the plurality of packets in one or more software memory buffers;

generating a plurality of work elements, each work element associated with one or more of the plurality of packets and including metadata to be used to facilitate QoS traffic classification of the one or more of the plurality of packets associated with the work element; and queueing the plurality of work elements in the work submission queue.

5. The method of claim 4, further comprising:

parsing, on the network controller, the metadata in a work element to determine a QoS traffic class to which the one or more packets associated with the work element are classified; and queuing the work element in an egress queue associated with the traffic class.

6. The method of claim 4, wherein a work element includes a direct memory access (DMA) descriptor identifying a memory location in a software memory buffer for each of the one or more of the plurality of packets associated with the work element and a length of that packet, the method further comprising:

employing the DMA descriptor to copy or write data corresponding to the one or more packets associated with the work element from the software memory buffer to an egress buffer on the network controller using a DMA operation.

7. The method of claim 6, wherein the DMA operation is facilitated by a DMA block on the network controller implementing a Single Root Virtual I/O (SR-IOV) Peripheral Component Interconnect (PCI) virtual function.

8. The method of claim 6, wherein the DMA operation is facilitated by a DMA block on the network controller implementing a Scalable IOV (S-IOV) Peripheral Component Interconnect (PCI) virtual function.

9. The method of claim 4, further comprising:
fetching, via the network controller, a work element from the work submission queue; and
writing back data, via the network controller, to the work submission queue identifying the work element has been fetched from the work submission queue.

10. The method of claim 4, wherein each work element includes an identifier, further comprising:
implementing a respective work completion queue for each of the at least two of the plurality of virtual machines or containers hosted by the compute platform;
completing work on the network controller defined by a work element; and
using a direct memory access (DMA) operations to add an entry including the identifier for the work element to the work completion queue.

11. The method of claim 4, further comprising:
submitting work elements into the work submission queue using an original order; and
performing work defined by the work elements on the network controller out-of-order relative to the original order.

12. A network controller, comprising:
a plurality of replicated circuit blocks, each including,
a Direct Memory Access (DMA) block;
a traffic classifier;
a plurality of egress queues; and
one or more scheduler components; and
a network port, having an associated egress buffer,
wherein the network controller is configured to be implemented in a compute platform, and
wherein during operation the network port is coupled to a network and wherein each replicated circuit block is configured to,
effect Quality of Service (QoS) traffic classification of packet flows corresponding to packets generated by software running on a respective virtual machine or running in a respective container on the compute platform;
schedule egress of packets to be sent outbound from the network port into the network based on the QoS traffic classification of the packets; and
transmit packets that have been scheduled for egress outbound from the network port into the network.

13. The network controller of claim 12, wherein the network controller is configured to classify the packet flows into QoS traffic classes using QoS traffic classifier policies defined by one or more of a data center operator, a management entity of the data center, and an orchestrator entity of the data center that are received by the network controller.

14. The network controller of claim 12, wherein a replicated circuit block is configured to:
one of receive or fetch a work element from a work submission queue implemented in system memory in the compute platform, the work element associated with one or more packets and including metadata to facilitate QoS traffic classification of the one or more packets associated with the work element;
parse the metadata in a work element to determine a QoS traffic class to which the one or more packets associated with the work element are classified; and
queue the work element in an egress queue associated with the traffic class.

15. The network controller of claim 14, wherein the replicated circuit block is further configured to:
implement a scheduling algorithm used to select a work element from one of the plurality of egress queues during each of a plurality of scheduling rounds; and
forward the work element that is selected to the egress buffer.

16. The network controller of claim 14, wherein the replicated circuit block is configured to:
fetch a work element from the work submission queue using a first DMA operation; and
write back data to the work submission queue identifying the work element has been fetched from the work submission queue using a second DMA operation.

17. The network controller of claim 14, wherein a work element includes a DMA descriptor identifying a location in a memory buffer in the system memory for each of the one or more packets associated with the work element and a length of that packet, and wherein the network controller is further configured to:
employ the DMA descriptor to copy or write data corresponding to the one or more packets associated with the work element from the memory buffer in the system memory to the egress buffer on the network controller using a DMA operation.

18. The network controller of claim 12, wherein the DMA block for each of the replicated circuit blocks is configured to implement a Single Root Virtual I/O (SR-IOV) Peripheral Component Interconnect (PCI) virtual function.

19. The network controller of claim 12, wherein the DMA block for each of the replicated circuit blocks is configured to implement a Scalable IOV (S-IOV) Peripheral Component Interconnect (PCI) virtual function.

20. The network controller of claim 14, wherein each work element includes an identifier, and wherein the network controller is further configured to:
complete work defined by a work element; and
add an entry including the identifier for the work element to a work completion queue in system memory using a DMA operation.

21. The network controller of claim 14, wherein a replicated circuit block is further configured to:
receive or retrieve work elements from the work submission queue in an original order; and
perform work defined by the work elements out-of-order relative to the original order.

22. A system comprising:
a compute platform, comprising a processor operatively coupled to system memory and having an input/output (I/O) interface;
a network controller, coupled to the processor via the I/O interface, comprising a plurality of circuit blocks and having a network port,
wherein the system is configured to perform operations when installed in a data center and the network port is coupled to a network in the data center including,
host one of a plurality of virtual machines (VMs) or containers in which a plurality of applications are run;
perform data plane operations via execution of software running in the virtual machines or containers, the data plane operations including encapsulating data generated by the plurality of applications into packets to be sent over the network as traffic flows;
wherein each of the plurality of circuit blocks is configured to perform operations including, perform control plane operations including performing Quality of Service (QoS) traffic classification to classify the packets to be sent over the network into QoS traffic classes, wherein packets belonging to a give traffic flow are classified to the same QoS traffic class;

schedule, for a respective VM or container, egress of classified packets generated by one or more applications running in the VM or container and to be transmitted outbound from the network controller onto the network, wherein the classified packets are scheduled for egress as a function of QoS traffic classifications of the packets; and transmit packets that are scheduled for egress onto the network via the network port.

23. The system of claim 22, wherein the system is further configured to:

for each of at least two of the plurality of virtual machines or containers hosted by the compute platform, implement a respective work submission queue;

receive data from one or more applications to be transmitted to a destination via the network;

packetize the data into a plurality of packets and buffer the plurality of packets in one or more software memory buffers;

generate a plurality of work elements, each work element associated with one or more of the plurality of packets and including metadata to be used to facilitate QoS traffic classification of the one or more of the plurality of packets associated with the work element; and queue the plurality of work elements in the work submission queue;

on the network controller, receive or retrieve a work element from a work submission queue;

parsing the metadata in the work element to determine a QoS traffic class to which the one or more packets associated with the work element are classified; and queue the work element in an egress queue associated with the traffic class.

24. The system of claim 23, wherein a work element includes a direct memory access (DMA) descriptor identifying a memory location in a software memory buffer for each of the one or more packets associated with the work element and a length of that packet, wherein the network controller includes an egress buffer; and wherein the system is further configured to:

access the DMA descriptor in a work element to copy or write data corresponding to the one or more packets associated with the work element from the software memory buffer in which the one or more packets are buffered to the egress buffer using a DMA operation.

25. The system of claim 24, wherein the system is further configured to:

implement a respective work completion queue in system memory for each of the at least two of the plurality of virtual machines or containers hosted by the compute platform;

complete, on the network controller, work defined by a work element; and add an entry including an identifier for the work element to the work completion queue using a DMA operation.

* * * * *